Patented Mar. 11, 1924.

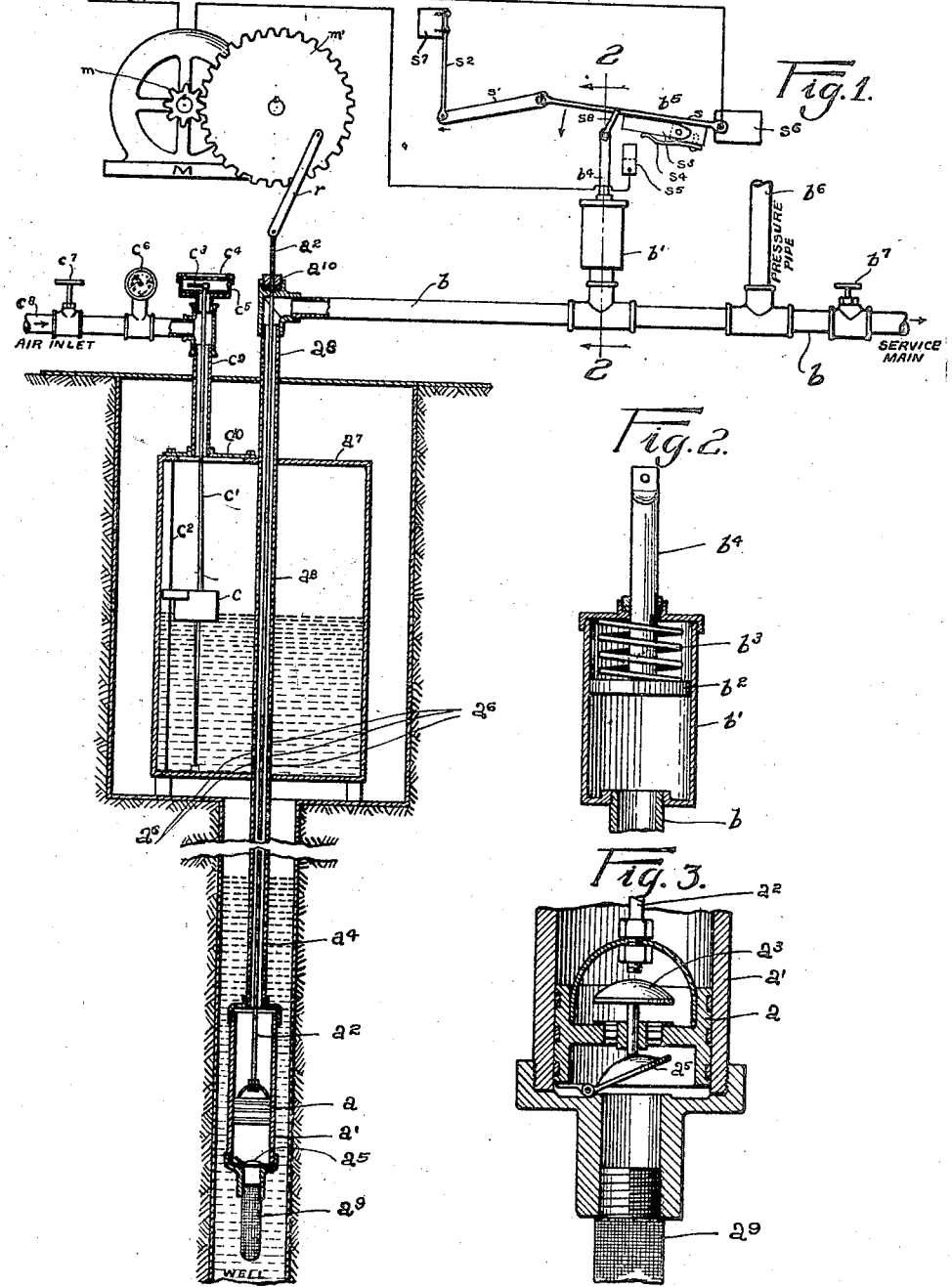

1,486,533

UNITED STATES PATENT OFFICE.

GLENN MUFFLY, OF CLEVELAND HEIGHTS, OHIO.

WATER-SUPPLY SYSTEM.

Application filed June 22, 1922. Serial No. 570,069.

*To all whom it may concern:*

Be it known that I, GLENN MUFFLY, a citizen of the United States of America, and a resident of Cleveland Heights, county of Cuyahoga, and State of Ohio, have invented a new and useful Improvement in Water-Supply Systems, of which the following is a specification.

This invention relates mainly to well water supply systems, and more especially to underground storage devices and distribution means therefor.

The main objects of the invention are to provide for storing water under ground and subject to suitable service pressure in such manner as to provide a continuous supply of naturally cooled water; to provide means of improved form to pump and control the flow of water in such a system; to provide improved means for ready inspection to determine the amount of water in storage at any time; and to provide means of improved form to automatically start and stop the motor responsive to exhaustion and replenishment of the storage water respectively.

An illustrative embodiment of this invention is shown conventionally in the accompanying drawings in which—

Figure 1 is a diagram of the system as a whole.

Fig. 2 is an enlarged detail view of the switch operating piston device on the line 2—2 of Figure 1.

Fig. 3 is an enlarged axial section of the lower end of the pump cylinder and valve mechanism.

In the construction shown in the drawings the piston $a$, acting within the cylinder $a^1$ and operated by the rod $a^2$, carries a check-valve $a^3$, and at each upward stroke lifts the water in pipe $a^4$ and draws more water into said cylinder through the lower check-valve $a^5$. On the downward stroke of the piston the lower check-valve $a^5$ closes and water passes through check-valve $a^3$ to the upper side of the piston, where it is trapped by check-valve $a^3$ and lifted by the next upward stroke of piston $a$.

The water thus lifted from the well or other source of supply is delivered through openings $a^6$ of pipe $a^4$ into an air-tight storage tank $a^7$. As the water level in this tank is raised above the openings $a^6$ air is trapped and compressed in the upper portion of said tank. The air pressure thus developed forces water up through the well pipe $a^8$ under a pressure that increases as the air space in tank $a^7$ diminishes.

The pump cylinder $a^1$ is preferably submerged in the water supply, but it may be located with its main body part near enough above the water level to insure that water will be drawn into its submerged lower part and raised by suction. In either event it is desirable to employ a strainer $a^9$ at the point of water intake. A packing gland $a^{10}$ is provided where rod $a^2$ leaves pipe $a^8$ and a discharge pipe $b$ opens out of pipe $a^8$ at or near the top to connect with the water delivery system.

Connected with pipe $b$ is a pressure-actuated means for shutting off the source of power to the pump rod $a^2$. In the construction shown a cylinder $b^1$ is employed with a piston $b^2$ acted upon on one side by the water pressure in pipe $b$ and upon the other by a spring $b^3$. When the water pressure in cylinder $b^1$ exceeds the force exerted by said spring $b^3$ the rod $b^4$ is moved toward the point at which power is shut off, as by opening a motor control switch $b^5$.

In the case of a self-starting source of power, such as an electric motor M here shown connected by gear $m$ and $m'$ and rod $r$ to rod $a^2$ or in some instances a gas engine (not shown) equipped with a self-starting device, the pumping operation is automatically resumed at any time that the water pressure drops to a predetermined point. In the event that manual power is employed, or that the source of power is not self-starting, the rod $b^4$ may be arranged to actuate a signal, as will be understood though not shown, when water pressure has fallen to a predetermined point.

As a precaution against the possible failure of the automatic means for shutting off the power I have shown a safety pipe $b^6$ which is connected to a safety valve (not shown) or carried to a suitable height to serve as a safety overflow or pressure pipe.

Referring again to tank $a^7$, the float $c$ is arranged to rotate the pivoted spiral rod $c^1$, rotation of the float itself being prevented by sliding engagement with a vertical rod $c^2$. The degree of rotation of rod $c^1$ and hence the height of water in tank $a^7$ is indicated by a pointer $c^3$, which is visible through the glass $c^4$, said pointer being secured coturnably to the top of rod $c^1$. An air-tight joint is maintained between the glass $c^4$ and the casing $c^5$ surrounding pointer $c^3$ to prevent air leakage from the tank $a^7$. The air line $c^9$ through which rod $c^1$ passes is connected with the pressure gauge $c^6$. A comparison between the readings of pressure gauge $c^6$ and pointer $c^3$ will reveal the existence of an air leak if there be any. In case the gauge $c^6$ shows a lower air pressure than is usual for a given height of water as indicated by pointer $c^3$ the air pressure may be raised to the desired point by pumping air in through pipe $c^8$ after opening valve $c^7$. Pipe $c^8$ is substantially a continuation of the pipe $c^9$ which contains rod $c'$.

In the absence of any air leakage this operation should seldom be necessary, and when required the correct air pressure may be restored by another method without the aid of an air pump as follows: close valve $b^7$; disconnect rod $a^2$ from the power head or rod $r$ and lower the piston $a$ to the bottom of cylinder $a^1$, thus causing valves $a^3$ and $a^5$ to open as shown in Fig. 3; open valve $c^7$; wait for water to drain from tank $a^7$; close valve $c^7$; re-connect rod $a^2$ to power head; pump water up to desired level; and reopen valve $b^7$. The amount of air trapped in tank $a^7$ is thus predetermined by the location of the highest hole $a^6$, which is established by the manufacturer for a given class of service.

The float mechanism including member $c$ may be taken out for inspection or repairs by removing cover plate $c^{10}$. In case it is necessary to pull the entire tank and pump from the well, the water is first drained from the tank $a^7$ and pipes $a^4$ and $a^8$ by the method above described, that is to say by disconnecting rod $a^2$ and opening valve $c^7$, so that it is not required to lift any unnecessary load of water.

The tank $a^7$ is preferably located far enough below the ground level to insure that the water stored under pressure therein will be kept fresh and cool in the summer and will be kept from freezing in the winter. Should the level of water supply stand near the ground level as when the well is full, in wet seasons, tank $a^7$ may be partially or wholly submerged in the water and must then be anchored or weighted down to prevent it from floating. The capacity of the tank $a^7$ should be such that ordinary demands for water may be met without starting the pump each time that water is drawn from the line.

A positive range of storage capacity, independent of intermittent starting and stopping of the pump may to advantage be provided for, as by means of a snap operated motor-switch requiring a substantial margin of water-level controlled pressure for actuation. For instance the switch $b^5$ may comprise mainly a toggle device including bars $s$ and $s'$; a spring $s^2$; a quick break blade $s^3$ pivoted to bar $s$ and urged against same by a spring $s^4$; and a contact $s^5$. Bar $s$ is pivoted to the stationary support $s^6$ and spring $s^2$ is secured to a fixed support $s^7$. Rod $b^4$ is connected to bar $s$ by means of a pivot connected link $s^8$.

When the pressure diminishes sufficiently in tank $a^7$ the switch toggle lowers to the critical snap-down point and quickly closes the blade $s^3$ against contact $s^5$. Then when the motor M has run sufficiently to restore the pressure to normal in tank $a^7$ the toggle is raised to its critical snap-up point and the switch is suddenly opened. But in this latter operation the switch remains firmly closed up to the last moment, because as the bar $s^5$ swings upward the blade $s^3$ remains gripped frictionally by the terminal $s^5$ and does not break contact until the toggle snaps over, when it jumps away quickly under action of spring $s^4$.

Although but one specific embodiment of this invention has been herein shown and described, it will be understood that numerous details of the construction shown may be altered or omitted without departing from the spirit of this invention as defined by the following claims.

I claim:

1. A water supply system comprising in combination an air-tight storage tank, a pump cylinder, a piston within said cylinder, pump valves for said sylinder and pitson respectively, a pipe connecting said pump cylinder with said tank, a rod passing through said pipe and connecting with said piston for the purpose of actuating same, a water outlet near the bottom of said tank, and a water delivery pipe connected with said outlet.

2. A water supply system comprising in combination an air-tight storage tank, a pump cylinder, a piston within said cylinder, pump valves for said cylinder and piston respectively, a pipe connecting said pump cylinder with said tank, a rod passing through said pipe and connecting with said piston for the purpose of actuating same, a water outlet near the bottom of said tank, and automatic gravity actuated means for draining said tank and pipes when said rod is released and the piston allowed to drop below the normal downward limit of its travel.

3. In a water supply system, an air-tight storage tank, a water lift pipe connected with the bottom of said tank, a pump cylinder connected with said water lift pipe, a piston within said cylinder, a water delivery pipe taking water from a point near the bottom of said tank and conducting it upward through the top of said tank, a rod connected with said piston for the actuation thereof and passing through said water lift pipe, tank and water delivery pipe, and means for actuating said rod.

Signed at Cleveland, Ohio, this 19th day of June 1922.

GLENN MUFFLY.